Aug. 24, 1926.
H. G. WEYMOUTH
1,596,957
AUTOMOBILE FENDER GUARD
Filed Dec. 4, 1924
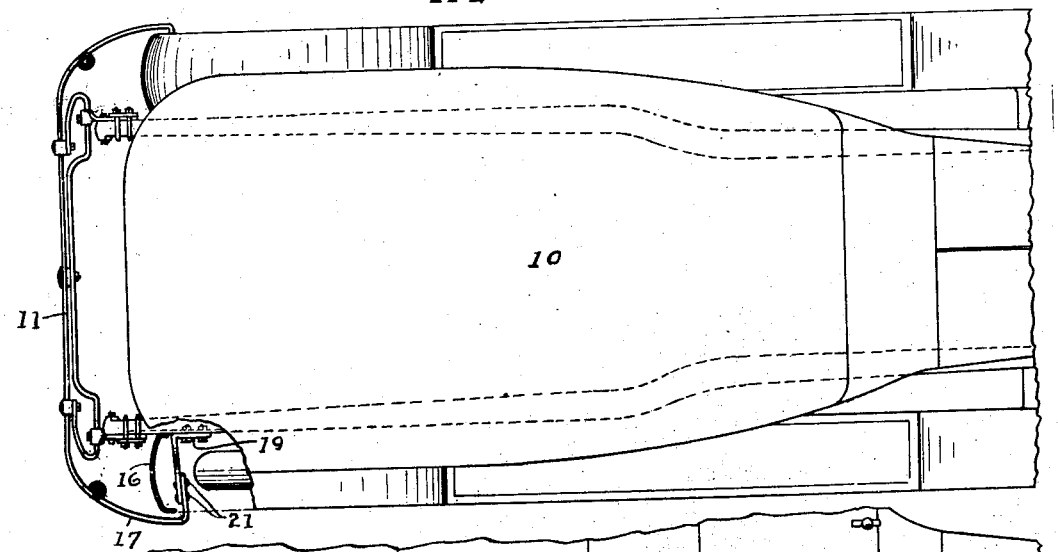
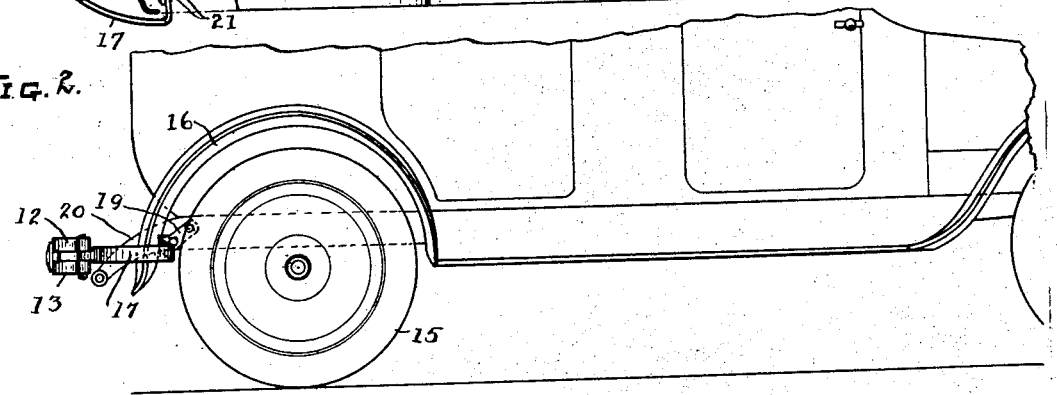
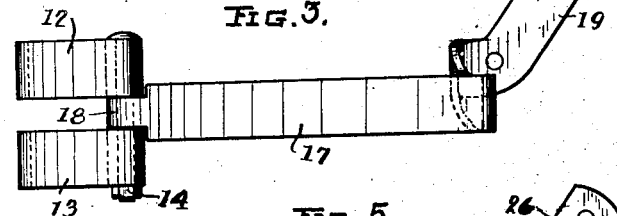
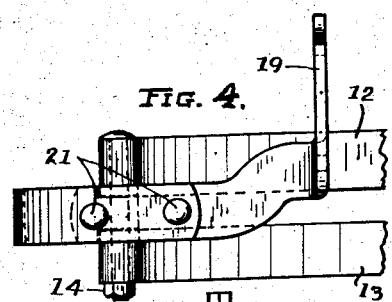
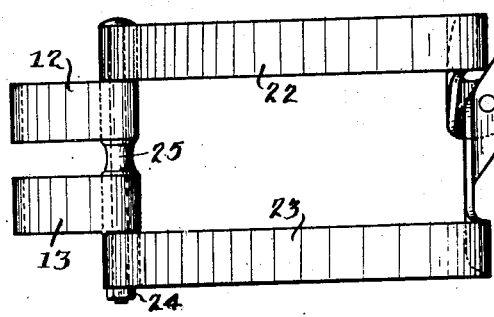
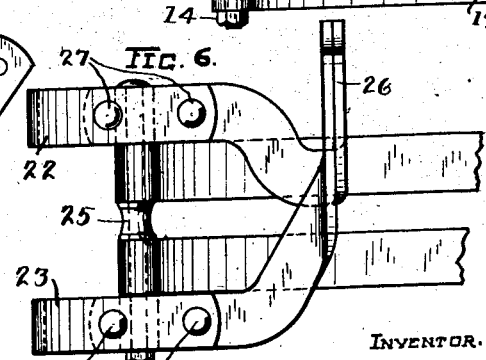
INVENTOR.
H. G. WEYMOUTH
Attorney Patented Aug. 24, 1926.

1,596,957

UNITED STATES PATENT OFFICE.

HARRY G. WEYMOUTH, OF CLEVELAND, OHIO, ASSIGNOR TO THE EATON AXLE AND SPRING COMPANY, OF CLEVELAND, OHIO, A CORPORATION OF OHIO.

AUTOMOBILE FENDER GUARD.

Application filed December 4, 1924. Serial No. 753,777.

This invention relates especially to guards for protecting the rear wheel fenders of an automobile and has for one of its objects the provision of a guard of simple and comparatively inexpensive construction that will be substantial and adapted to protect the fender against all ordinary blows from the rear. A further object is to provide a construction that may be easily mounted on the vehicle and is adapted for attachment to the end of the bumper with which automobiles are ordinarily equipped.

Other objects and the features of novelty will be apparent from the following description, taken in connection with the accompanying drawings, of which;

Figure 1 is a plan view of a vehicle embodying my invention, certain parts being broken away;

Fig. 2 is a side elevation thereof.

Fig. 3 is an enlarged side elevation of the fender guard shown in Fig. 2;

Fig. 4 is an elevation thereof as the guard would appear from the right of Fig. 3; and Figs. 5 and 6 are views similar to Figs. 3 and 4, respectively, but showing a fender guard embodying my invention and composed of a plurality of vertically spaced bars for the purpose of protecting a larger portion of the fender.

Referring to the drawings, 10 indicates a vehicle body and 11 a bumper mounted on the rear of the vehicle frame according to well-known practice, and comprising a plurality of vertically spaced impact bars 12 and 13, which have aligned eyes at their opposite ends connected together by a bolt 14. The wheel of the vehicle is indicated at 15 and the fender or mud guard, therefor, is indicated at 16.

In the form of the invention illustrated in Figs. 1 to 4 my improved fender guard consists of a bar 17, of spring steel, and provided at one end with an eye 18 which engages the bolt 14 between the bumper bars 12 and 13. In order to provide a substantial construction I make the bar 17 of flat stock, the width of which is preferably about the same as that ordinarily used for the bars 12 and 13, and, since the vertical distance between the latter bars is usually less than the width thereof, it is necessary to reduce the length of the eye 18 in order to have it fit between the bars 12 and 13 (see Fig. 3).

The bar 17 extends longitudinally of the automobile, outside the fender 16, and, to form a supporting bracket, is bent transversely into the space between the wheel 15 and the fender 16 and then longitudinally and upward to provide a foot 19 which is bolted, or otherwise secured, to the side member 20 of the automobile frame, adjacent the inner side of the wheel. To facilitate manufacturing I prefer to make the bar 17 in two pieces which may be secured together by rivets or bolts 21, in the space between the wheel 15 and the fender 16.

In the form of the invention illustrated in Figs. 5 and 6, I provide two bars 22 and 23, each of which has an eye, the bar 22 being placed above the bar 12 and the bar 23 below the bar 13 and all connected together by a long bolt 24. At 25 there is indicated the ordinary spacer which is provided on the connecting bolt for spacing the bumper bars 12 and 13. The bars 22 and 23 extend longitudinally of the vehicle, in substantially the same manner as the bar 17, of the other form of construction, and have their forward ends turned into the space between the wheel 15 and the fender 16 and then turned forwardly and preferably overlapped, as indicated at 26, and secured by bolts or otherwise to the side of the frame member 20. To facilitate manufacturing the bars 22 and 23 are each made in two pieces which are connected together, respectively, by the rivets or bolts 27 and 28.

The constructions illustrated are well adapted to protect the fender 16 because the rear ends of the bars 17, 22 and 23 are firmly supported by the end of the bumper and the forward ends of these bars are firmly supported by being connected with the vehicle frame. Where the bars 17, 22 and 23 bend around the fender for attachment to the vehicle frame they are preferably spaced some distance from the fender so as to permit a certain amount of deflection without engaging with the fender. From Fig. 1 it will be evident that the bar 17 will effectively ward off a grazing blow from the rear and thus protect the fender 16 from damage. The advantage of the construction illustrated in Figs. 5 and 6 is that the vertical spacing of the bars 22 and 23 gives protection to a much larger area of the fender 19 than does the single bar 17.

Having thus described my invention, what I claim is:

1. In a guard for an automobile wheel fender, the combination of a bumper extending transversely of the automobile at one end thereof, a supporting bracket attached to the automobile frame and extending outwardly therefrom between the wheel and its fender, and a guard member attached to one end of said bumper and extending longitudinally of the automobile outside said fender and having one end attached to said bracket.

2. In a guard for an automobile wheel fender, the combination of a bumper extending transversely of the automobile at one end thereof, and a guard, having one end attached to said bumper, and extending longitudinally of the automobile outside the fender and then laterally between the fender and the wheel and having its other end attached to the vehicle frame adjacent the inner side of the wheel.

3. In a guard for an automobile wheel fender, the combination of a bumper extending transversely of the automobile at one end thereof and comprising a plurality of vertically spaced bars provided with aligned eyes at their ends which are connected together by a bolt extending therethrough, and a guard having an eye at one end engaging said bolt, said guard extending longitudinally of the automobile outside said fender and having its other end bent transversely in the space between the wheel and the fender and attached to the automobile frame.

4. In a guard for an automobile wheel fender, the combination of a bumper extending transversely of the automobile at one end thereof and comprising a plurality of vertically spaced bars provided with aligned eyes at their ends which are connected together by a bolt extending therethrough, and a guard comprising a plurality of vertically spaced bars each having an eye at one end engaging said bolt, and extending longitudinally of the automobile outside said fender and having their other ends bent transversely in the space between the wheel and the fender and attached to the automobile frame.

In testimony whereof I affix my signature.

HARRY G. WEYMOUTH.